(12) United States Patent
Rothenberger et al.

(10) Patent No.: US 11,996,678 B2
(45) Date of Patent: May 28, 2024

(54) SWITCHING AND/OR DISTRIBUTING DEVICE

(71) Applicant: Eaton Intelligent Power Limited, Dublin (IE)

(72) Inventors: Richard Ellis Rothenberger, Phoenix, NY (US); Michael Rene Ketterer, Soest (DE); Reiner Naumann, Mannheim (DE); Marco Knab, Eberbach (DE); Dieter Sauer, Heddesbach (DE); Toni Ott, Neckargemund (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 154 days.

(21) Appl. No.: 17/419,280

(22) PCT Filed: Dec. 26, 2019

(86) PCT No.: PCT/EP2019/025491
§ 371 (c)(1),
(2) Date: Jun. 28, 2021

(87) PCT Pub. No.: WO2020/135933
PCT Pub. Date: Jul. 2, 2020

(65) Prior Publication Data
US 2022/0077664 A1 Mar. 10, 2022

(30) Foreign Application Priority Data
Dec. 28, 2018 (DE) ............... 10 2018 251 785.1

(51) Int. Cl.
*H02B 1/052* (2006.01)
*H02B 1/20* (2006.01)
*H02B 1/21* (2006.01)

(52) U.S. Cl.
CPC ............. *H02B 1/052* (2013.01); *H02B 1/205* (2013.01); *H02B 1/207* (2013.01); *H02B 1/21* (2013.01)

(58) Field of Classification Search
CPC ........ H02B 1/052; H02B 1/205; H02B 1/207; H02B 1/21
See application file for complete search history.

(56) References Cited

U.S. PATENT DOCUMENTS

| 2,986,676 A | 5/1961 | Edmunds |
| 2,997,627 A * | 8/1961 | Ellegood ............ H02B 1/21 |
| | | 174/88 B |

(Continued)

FOREIGN PATENT DOCUMENTS

| DE | 3813099 A1 * 11/1989 ............ H02B 1/205 |
| DE | 195 13 645 A1 10/1996 |

(Continued)

OTHER PUBLICATIONS

International Search Report for PCT/EP2019/025491, dated Mar. 12, 2021, 3 pages, Rijswijk, Netherlands.

(Continued)

*Primary Examiner* — Robert J Hoffberg
(74) *Attorney, Agent, or Firm* — Stinson LLP

(57) ABSTRACT

A switching and/or distributing device has at least one receiving housing and a housing cover. Arranged in at least one housing rail region are one or a plurality of power distribution rails which extend substantially in a main plane and are connected to sub-distribution rails. In at least a first plane, said sub-distribution rails extend substantially in parallel to the main plane and are electrically insulated from one another and extend in the direction of at least one housing component region, wherein in the housing component region, in particular modular components, which contain electrical/electronic operating means, are in electrical (Continued)

contact with one sub-distribution rail each. As a result, a switching and/or distributing device is improved in such a way that the arrangement of corresponding components is possible easily without much additional effort even in potentially explosive atmospheres and a plurality of components of different types and of different sizes can be arranged at the same time.

25 Claims, 2 Drawing Sheets

(56) References Cited

U.S. PATENT DOCUMENTS

| | | | |
|---|---|---|---|
| 3,495,135 A | 2/1970 | Paape | |
| 3,626,253 A | 12/1971 | Sturdivan | |
| 3,780,355 A * | 12/1973 | Salvati | H02B 1/20 361/624 |
| 3,793,564 A * | 2/1974 | Salvati | H02B 1/20 361/624 |
| 4,025,826 A * | 5/1977 | Wilson | H02B 1/21 174/133 B |
| 4,180,845 A * | 12/1979 | Shariff | H02B 1/21 174/133 B |
| 4,316,234 A * | 2/1982 | Takagi | H02B 1/21 361/2 |
| 4,543,455 A | 9/1985 | Pollerspoeck | |
| 4,796,159 A | 1/1989 | Miksche | |
| 5,905,631 A * | 5/1999 | Winkler | H02B 1/36 361/601 |
| 7,511,946 B2 * | 3/2009 | Malkowski, Jr. | H02G 5/025 174/174 |
| 7,826,201 B2 * | 11/2010 | Schell | H02B 1/21 439/372 |
| 8,004,826 B2 * | 8/2011 | Merkel | H02B 1/202 361/639 |
| 8,420,935 B2 * | 4/2013 | Malkowski, Jr. | H02B 1/21 174/70 B |
| 8,625,257 B2 * | 1/2014 | Schalk | H02B 1/056 361/652 |
| 9,646,738 B2 * | 5/2017 | Serdynski | H02B 1/21 |
| 9,812,848 B2 * | 11/2017 | Bellows | H02B 1/21 |
| 9,917,432 B2 * | 3/2018 | Serdynski | H02B 1/21 |
| 10,158,203 B2 * | 12/2018 | Peterson | H01R 25/162 |
| 10,720,765 B2 * | 7/2020 | Serdynski | H02B 1/21 |
| 10,819,089 B2 * | 10/2020 | Naumann | H05B 3/0019 |
| 10,855,059 B2 * | 12/2020 | Valsecchi | H02B 1/21 |

FOREIGN PATENT DOCUMENTS

| | | | | |
|---|---|---|---|---|
| DE | 102012016133 B4 | | 9/2014 | |
| EP | 2 461 440 A2 | | 6/2012 | |
| GB | 2323978 A | * | 10/1998 | H02G 5/00 |
| KR | 200302957 Y1 | * | 2/2003 | H01H 71/08 |

OTHER PUBLICATIONS

International Preliminary Report on Patentability (Written Opinion) for PCT/EP2019/025491, dated Jun. 16, 2021, 8 pages, Geneva Switzerland.

* cited by examiner

SWITCHING AND/OR DISTRIBUTING DEVICE

CROSS-REFERENCE TO RELATED APPLICATION

This application is a 371 of international PCT Serial No. PCT/EP2019/025491, filed Dec. 26, 2019, which claims the benefit of German Serial No. 102018251785.1, filed Dec. 28, 2018, the entire contents of which are incorporated herein by reference.

FIELD

The invention relates to a switching and/or distributing device in which a plurality of components with electrical operating means can be arranged. Such a switching and/or distributing device has at least one receiving housing and one housing cover. One or a plurality of power distribution rails are arranged in at least one housing rail region and extend substantially in a main plane.

BACKGROUND

In switching and/or distributing devices known from practice, the corresponding components are detachably connected to these power distribution rails. The components are screwed or wired to the power distribution rails or other devices of the switching and/or distributing device. The arrangement of the corresponding components requires a relatively large amount of time and specific knowledge about the work in potentially explosive atmospheres. This also applies to the exchange of such a component. Furthermore, as a rule, the arrangement of the components in the switching and/or distributing device is predetermined so that few possible variations for arranging a different number or components of different sizes are possible overall.

SUMMARY

The invention is therefore based on the object of improving a switching and/or distributing device in such a way that the arrangement of corresponding components is possible easily without much additional effort even in potentially explosive atmospheres and a plurality of components can be arranged in different ways and in different sizes at the same time.

This object is achieved by the features of claim 1. The invention is characterized in particular in that the power distribution rail(s) extend substantially in a main plane and are connected to sub-distribution rails, which extend in at least a first plane substantially in parallel to the main plane and are electrically insulated from one another. The sub-distribution rails run in the direction of at least one housing component region, wherein in this housing component region, in particular modular components, which contain electrical/electronic operating means, are in electrical contact with one sub-distribution rail each.

That is to say, due to the specific arrangement of the sub-distribution rails, the components are arranged in another region of the switching and/or distributing device (see the housing component region) which is accordingly designed for arranging components of different sizes even in different numbers. Depending on the arrangement and number of different components, corresponding sub-distribution rails are provided. All components are then arranged in the specific housing component region and are there, with their respective electrical/electronic operating means, in electrical contact with the sub-distribution rails in a modular manner, for example.

In order to enable easy arrangement of power distribution rails and sub-distribution rails, the power distribution rails can run substantially horizontally and/or the sub-distribution rails can run substantially vertically at an offset relative to one another. That is to say, the power distribution rail and the sub-distribution rail extend perpendicularly to each other in each case.

In order to be able to increase the number of sub-distribution rails in the given space, it may furthermore prove to be advantageous if the sub-distribution rails extend at least over part of their longitudinal extent in at least a first plane or a second plane that is substantially in parallel thereto. The two planes can be formed on the same side of the main plane or on different sides of the main plane. That is to say, the sub-distribution rails are arranged in different planes in the switching and/or distributing device so that they do not interfere with each other and are electrically separated from each other in order to avoid short circuits. In a simple exemplary embodiment, the sub-distribution rails in the first plane may, for example, be connected on a top side of the power distribution rail and the sub-distribution rails in the second plane may be connected on a bottom side of the power distribution rail to the power distribution rail in each case. However, there is also the possibility for the distances between the first and second planes to be greater so that the connection of power distribution rail to sub-distribution rails follows via separate connecting parts or ends of the sub-distribution rails bent or angled in the direction of the power distribution rail.

In order to simplify the connection of the components to the sub-distribution rails in the housing component region and in particular to be able to arrange all the components substantially in the same plane at least with regard to their electrical connection to the sub-distribution rails, the sub-distribution rails can be changed in their course before or after reaching the housing component region and in particular run in one plane. To this end, the sub-distribution rails are arranged perpendicularly to their longitudinal extent at a distance from one another and can then all run in the first plane, the second plane or the main plane in the housing component region.

This makes it possible for all components to be arranged with their connection surface or entirely in the same plane. Overall, power distribution rails and sub-distribution rails form, within the switching and/or distributing device, a busbar system, which can be supplemented by further power distribution rails and/or sub-distribution rails as required. In addition to the busbar system, a bus system, which is in particular formed from local buses and/or field buses, can likewise be arranged in the switching and/or distributing device. That is to say, analogously to the energy supply, data transmission can be provided, wherein a corresponding arrangement of the buses can be formed analogously to the power distribution rail with a plurality of sub-distribution rails.

In order to be able to insert and exchange the components easily, the components can be detachably connected to the sub-distribution rails. As a rule, the sub-distribution rails are of smaller width than the power distribution rail and the components can be connected electrically and in particular detachably to the sub-distribution rail directly or indirectly.

It is possible for the busbar system and in particular the power distribution rail to be arranged together with the components in a region of the switching and/or distributing device. In this case, the sub-distribution rails extend from the one or a plurality of power distribution rails in the direction toward the components. However, it is likewise possible for the power distribution rails to be arranged in a housing rail region separated from the housing component part. This housing rail region may be separated from the housing component region by an intermediate wall. In this case, there is also the possibility that the regions are also separated further, i.e., have receiving housings and housing covers, so that overall the switching and/or distributing device is formed from two or possibly even more receiving housings and housing covers. In this case, the sub-distribution rails extend from the housing rail region into the housing component region.

In order to be able to arrange different power distribution rails in different numbers as required, it may prove to be advantageous if the power distribution rail is in particular detachably mounted on a housing rear wall. This makes it possible for a plurality of such power distribution rails to be mounted on the housing rear wall in parallel to one another next to one another and to be insulated from one another and, if necessary, for additional power distribution rails to be added or power distribution rails to be removed.

In order to ensure that the components are electrically insulated from the sub-distribution rails, it is conceivable in one exemplary embodiment for a separating plate, in particular an insulating separating plate, to be arranged between the components and at least the sub-distribution rails. Such a separating plate can have cutouts and/or openings for an electrical connection between components and sub-distribution rails. The separating plate is arranged in particular in the housing component region.

It is pointed out at this point that such a separating plate with the features described further below for arranging and receiving the components can also be used without a corresponding three-dimensional arrangement of the busbar system of the preceding claims. That is to say, part of the present invention is also the arrangement of such a separating plate in a switching and/or distributing device with its corresponding features and independently of the busbar system used.

The separating plate has several advantages, which are explained below.

On the one hand, it is possible to latch the components in their electrical connection position to or on the separating plate. That is to say, the separating plate serves for the mechanical arrangement of the corresponding components, wherein the electrical connection takes place through the separating plate (see the corresponding cutouts and/or openings of the separating plate).

For this purpose, the separating plate can have different devices. In an advantageous exemplary embodiment, it may prove to be advantageous if the separating plate has, on its attachment side opposite the sub-distribution rails, in particular bordered insertion regions into which one or a plurality of components can be inserted and can be latched in their inserted electrical connection position. That is to say, the arrangement of the components is defined by these insertion regions. The insertion regions can be formed in different ways, wherein, in a simple exemplary embodiment, the insertion regions protrude, for example, on the attachment side of the separating plate and are formed with a uniform grid dimension or a multiple thereof. That is to say, a specific minimum component size and, analogously thereto, a minimum size of an insertion region that defines the minimum grid dimension may be defined. There is then the possibility that, for example in the case of a multiple of such a grid dimension for an insertion region, a plurality of components can accordingly be arranged in this insertion region. Analogously, this also applies to larger components which have corresponding dimensions in this multiple grid dimension.

In this case, it is possible for all insertion regions to have the same size, i.e., for example with the same multiple of the minimum grid dimension. The minimum grid dimension in this case may correspond to a minimum component size.

The corresponding latching device can be formed in the insertion region and can be arranged in particular for each minimum grid dimension.

In order to further simplify the construction of the switching and/or distributing device according to the invention, further devices may be provided, which can be used, for example, for the wiring within the corresponding housing. Such an example can be seen in the separating plate having horizontally and/or vertically extending cable ducts between adjacent insertion regions. The cable ducts run correspondingly between vertically adjacent or horizontally adjacent insertion regions and the components arranged therein.

In order to be able to connect corresponding cables in the cable ducts easily to the insertion regions and to the components, a connection block can substantially be assigned to each insertion region and be wired to one of the cable ducts. This wiring can be prefabricated so that each switching and/or distributing device is already prepared for receiving the maximum number of components in all insertion regions.

It has already been pointed out above that the insertion regions can in principle have different dimensions. The production of corresponding separating plates or the formation of the various components can, however, be simplified if necessary in that all insertion regions have substantially the same dimensions. That is to say, it is already known how many components and in what sizes can be used on the separating plate or in the corresponding insertion regions in what number.

In order to be able to use the components in potentially explosive atmospheres, it can furthermore be considered to be advantageous if each component has an encapsulated component housing and/or is designed to be explosion-protected. In this connection, it should also be noted that, for example, the latching can be formed in such a way that no sparks occur when a component is pulled out of the insertion region. This can be done, for example, by first carrying out an electrical disconnection and only subsequently a mechanical separation from the insertion region. In this connection, the insertion region can have an edge projecting from the separating plate, which edge forms, for example, a corresponding flashover-proof gap between the insertion region and the component housing. That is to say, the component is first only partially pulled out of the insertion region, wherein a corresponding gap is present between the wall and the component housing, which prevents a flashover into the outer atmosphere even if sparks arise. The component is then only pulled further out of the insertion region after electrical disconnection.

It has already been pointed out in part that corresponding devices of the switching and/or distributing device are hardwired or pre-wired. This may apply in particular to busbar system, bus system, components, cable ducts and/or connection blocks. That is to say, both the components and cable duct and connection block or busbar system and bus system are ready for use.

The pulling-out of a component can also be prevented in a different way so that, for example, pulling-out is only possible after switching off a corresponding power supply. This can be made possible, for example, by a locking device formed between component and insertion region and/or cutout or opening in the separating plate. In this connection, it is possible that the locking device releases the component for pulling-out only after the voltage supply has been switched off or the locking device is designed in the manner described above, i.e., that only a partial separation for interrupting the electrical contact and only subsequently a further separation for completely removing the component is possible.

In order to enable an appropriate explosion protection even in the region of the connection blocks, it is possible for the connection block to be designed in the "increased safety" ignition protection type.

This can also apply analogously to the connection between component and sub-distribution rail, which can likewise be electrically connected to one another in the "increased safety" ignition protection type.

In order to already prepare the switching and/or distributing device for external devices, it can furthermore prove to be advantageous if the cable duct is led out of the switching and/or distributing device and, if applicable, separate cable ducts are arranged at least for intrinsically safe and non-intrinsically safe circuits of the components or further devices of the switching and/or distributing device. That is to say, a cable duct for the intrinsically safe and at least one further cable duct for the non-intrinsically safe circuits would be arranged. All these cable ducts can be led out of the switching and/or distributing device.

In the case of the connection block, it can furthermore prove to be advantageous if it is formed in the ignition protection type Ex-e or Ex-i. Furthermore, it may be conceivable in this connection for a connection of components and sub-distribution rails to be formed in the "increased safety" ignition protection type, possibly with a protective connection to a pressure-resistant switch device.

The switching and/or distributing device according to the invention can itself be designed as a module, several of which can be arranged on a wall frame or stand frame.

The invention thus provides a switching and/or distributing device with an advantageous arrangement and design of a busbar system for supplying different components and a particularly favorable arrangement and mounting of various components by means of the corresponding separating plate. The various components can be appropriately encapsulated for potentially explosive regions and be supplied not only with electrical energy but also with signals and also be electrically connected to various circuits via the corresponding power distribution rails and sub-distribution rails. Substantially, everything in the switching and/or distributing device is already pre-wired so that only the corresponding components are inserted and, if applicable, latched in their electrical connection position. The corresponding wiring can likewise already be guided to the outside (see the cable ducts and connection blocks). The corresponding switching and/or distributing device can be designed as a process control system, automatic unit distribution system, heating circuit distribution system or the like. The pressure-resistantly encapsulated and snappable or latchable components may be automatic units, fuses, circuit breakers, main switches, engine starters, air-break contactors, installation contactors, push buttons or the like. They each have corresponding internal electrical and electronic components.

According to the invention, the components are arranged without screws in plug-in technology (see the insertion regions and the latching or snapping-open of the corresponding components).

An advantageous exemplary embodiment of the invention is explained in more detail below with reference to the figures enclosed in the drawing.

BRIEF DESCRIPTION OF THE DRAWINGS

Shown are.

DETAILED DESCRIPTION

Figure 1:
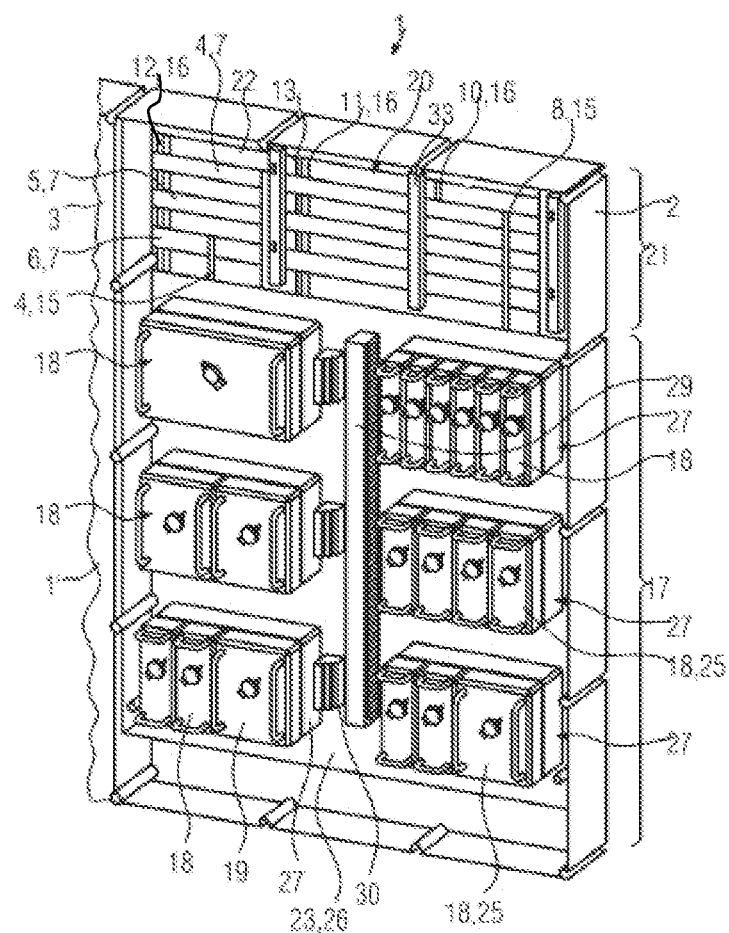
FIG. 1 a lateral perspective view obliquely from the front of an exemplary embodiment according to the invention of a switching and/or distributing device without a housing cover shown, and FIG. 2 an enlarged illustration of a component for insertion in a corresponding insertion region.

FIG. 1 shows a perspective view obliquely from the front of a switching and/or distributing device 1 according to the invention. Said switching and/or distributing device 1 has a box-like receiving housing 2 which comprises at least one outer wall and a housing rear wall 22. Such a switching and/or distributing device 1 can be arranged in a wall frame or stand frame next to further switching and/or distributing devices (see 1'). The switching and/or distributing device 1' is closed, for example, by an indicated housing cover 3. Said housing cover 3 can likewise be used in the further switching and/or distributing device 1 according to FIG. 1 but is not shown there.

A housing rail region 21 is formed in an upper region of the receiving housing 2, and a housing component region 17 is formed in a lower region of the receiving housing 2. A busbar system 20 of power distribution rails 4, 5, 6 and sub-distribution rails 8 to 14 is arranged in the housing rail region 21. Arranged in the housing component region 17 is an insulating separating plate 23 on which a plurality of components 18 with electrical and/or electronic operating means 19 contained therein is arranged (see also FIG. 2).

The power distribution rails 4, 5 and 6 run substantially horizontally in the receiving housing and can in particular be detachably fastened to the housing rear wall 22. The power distribution rails are used to supply power and can be connected to various circuits outside the switching and/or distributing device.

Sub-distribution rails 8 to 14 extend substantially perpendicularly to the power distribution rails 4 to 6. Above or below the power distribution rails 4 to 6, said sub-distribution rails 8 to 14 are electrically connected thereto. All the power distribution rails 4 to 6 are arranged in a main plane 7 which runs at a distance from the housing rear wall 22, wherein the corresponding power distribution rails 4 to 6 are fastened by brackets 33 in their mutual position at a distance from one another and relative to the housing rear wall 22.

The sub-distribution rails 8 to 14 run in two further plans 15 and 16, wherein the sub-distribution rails 8 and 14 arranged on a front side of the power distribution rails 4 to 6 in FIG. 1 are arranged in a first plane and the further sub-distribution rails 10, 11, 12, and 13 are arranged in a second plane 16. The sub-distribution rails 8 to 14 extend in the direction of the housing component region 17 and serve there for the electrical supply of the various components 18.

At this point, it is pointed out that the sub-distribution rails 8 to 14 in the housing rail region 21 can likewise run in only one plane in order to simplify contacting with the corresponding components 18. That is to say, the sub-distribution rails 8 to 14 are arranged in the housing component region 17 in only one plane, for example the main plane 7, the first plane 15 or the second plane 16. This plane forms a corresponding contact plane which is the same for all components 18 so that electrical contacting between sub-distribution rails 8 to 14 and components 18 is standardized.

In order to ensure for the sub-distribution rails 8 to 14 that they are in contact with only one power distribution rail 4 to 6, spacer elements may be arranged between the sub-distribution rails 8 to 14 and the power distribution rails 4 to 6, which spacer elements on the one hand ensure the connection of the sub-distribution rails to the power distribution rails and on the other hand, for example, prevent the sub-distribution rails from contacting a plurality of power distribution rails.

For arranging the various components 18 in the housing component region 17, the separating plate 23 is provided, which is likewise formed from an insulating material and has a series of insertion regions 27. Said insertion regions 27 are delimited by an edge 28 which protrudes in particular from an attachment side 26 of the separating plate 23 opposite the sub-distribution rails. A corresponding region 27 has at least a minimum grid dimension, which corresponds, for example, to the smallest size of a component 18. In the exemplary embodiment shown, the insertion regions 27 have a multiple of such a grid dimension so that, for example, a plurality of components 18 of the smallest size can be arranged in an insertion region 27 (see, for example, component according to FIG. 1). The remaining components likewise have a corresponding multiple of such sizes of the smallest components 18, which multiple may correspond to the multiple grid dimension of the insertion region 27 (see, for example, four components 18 in one insertion region or only two or one component in other insertion regions).

To each of the insertion regions is laterally assigned a connection block 30 which is connected to corresponding lines in a cable duct 29. Overall, the switching and/or distributing device according to the invention is pre-wired so that only insertion of the corresponding component in the selected insertion region 27 has to take place, wherein the component 18 is then connected in its connection point 25 (see FIG. 1) both to the corresponding sub-distribution rail on the one hand and to further connection lines in the direction of the connection block 30. The pre-wiring likewise includes the corresponding components which are only inserted into the insertion region 27 and latch or snap in there.

The components contain corresponding electrical and electronic operating means 19 in order to form, for example, an automatic unit, a fuse, a circuit breaker, a main switch, an engine starter, an air-break contactor, an installation contactor or the like.

It is also possible for components arranged to the left of cable duct 29 in FIG. 1, for example, to contain other operating means than the components arranged to the right of the cable duct. As a result, a certain pre-selection may be given, which also relates, for example, to the supply with different voltages, so that the components arranged to the left of the cable duct are connected via the corresponding sub-distribution rails to a different voltage supply than the components arranged to the right of the cable duct. This then likewise relates analogously to the further wiring between the insertion region, connection block and cable duct.

The cable duct 29 can be led out of the receiving housing 2 in order to be connected there to corresponding consumers outside the switching and/or distributing device.

Figure 2:
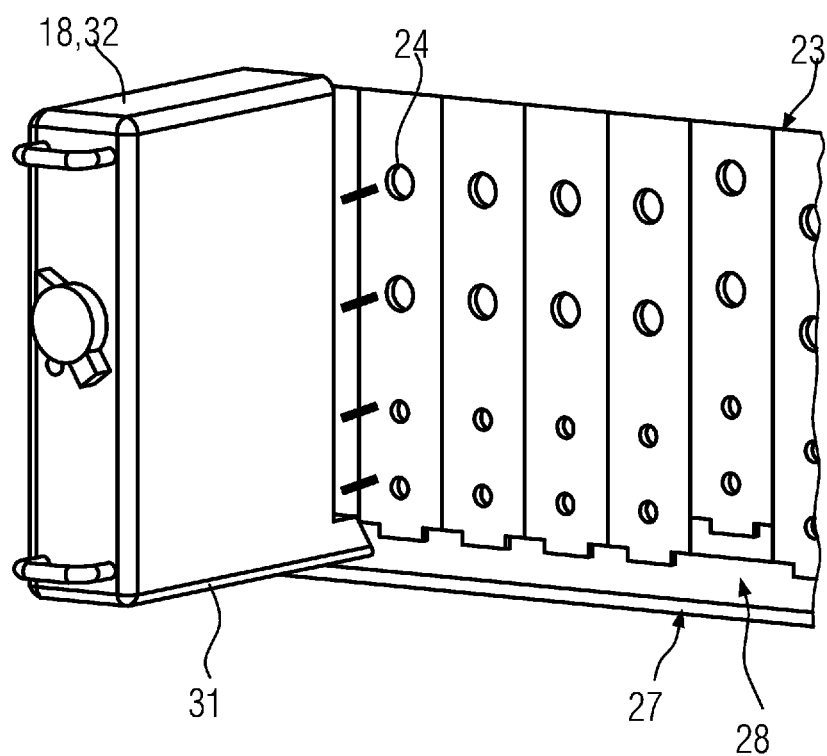

Corresponding devices for latching or snapping-in the various components in their connection position 25 are not shown in detail in FIG. 1 or 2. Various latching devices or snap-in devices can be used for this purpose. In this connection, it is furthermore possible for a component to be pulled out of the connection position 25 in two steps. In a first step, the electrical connection to the corresponding sub-distribution rail is disconnected, wherein the complete separation of component 18 and insertion region 27 can subsequently take place in the next step.

Furthermore, there is the possibility that an additional explosion-protected switch is provided at least for each insertion region 27 and switches off the power to this specific insertion region 27. The corresponding component can then be removed or inserted easily.

The components 18 have a corresponding component housing 31 in which the electrical/electronic operating means 19 are arranged (see also FIG. 2). On a rear side of the component housing 31 facing the sub-distribution rails, corresponding contact means are provided, by means of which electrical contacting of the sub-distribution rails can take place. For this purpose, the separating plate has corresponding cutouts and openings 24 (see also FIG. 2) which make it possible to contact these contacts of each component 18 with the sub-distribution rails 8 to 14.

The component 18 in FIG. 2 is arranged in a separate position 32, i.e., it is not yet completely arranged in the insertion region 27 and in particular is not yet in contact with an associated sub-distribution rail 8 to 14.

In FIGS. 1 and 2, for example, there are no further buses or the like, which can likewise be arranged in the switching and/or distributing device. These buses can form a separate bus system consisting of local bus, field bus and other buses. Via these buses, a corresponding data connection of the components to central devices or field devices arranged outside the receiving housing can be established. In this case, the bus system can be constructed analogously to the busbar system 20.

At this point, it is again pointed out that the invention relates on the one hand to the busbar system 20 consisting of power distribution rails 4 to 6 and sub-distribution rails 8 to 14 shown in the figures but on the other hand also to the specific arrangement of the components by means of a separating plate with insertion regions, connection blocks and cable duct.

The present invention substantially results in a three-dimensional busbar system consisting of current-carrying rails for use in potentially explosive atmospheres. The receiving housing has insertion regions 27 into which one or a plurality of components 18 can be inserted and can be latched or snapped-in there. A connection of the corresponding component 18 to the surroundings of the switching and/or distributing device takes place via connection blocks and cable ducts. It is pointed out in this respect that a plurality of cable ducts 29 is also possible in order, for example, to separately connect intrinsically safe and non-intrinsically safe circuits via the cable ducts and corresponding connection blocks to the outside.

The components 18 generally have encapsulated component housings 31 in order to satisfy the requirements for explosion protection in potentially explosive atmospheres.

Furthermore, it is possible for the housing rail region and the housing component region to be separated from one another, i.e., for a physical separation to be arranged between them, or for the various regions to be arranged, as a rule adjacently to one another, in their own receiving housings with their own housing cover.

The pre-wiring of the switching and/or distributing device and corresponding arrangement of the power distribution rails and sub-distribution rails can be effected, for example, in such a way that they correspond to a maximum supply so that the switching and/or distributing device according to the invention is already completed up to full capacity.

It has already been pointed out that the components 18 to the left and right of the cable duct 29 shown in FIG. 1 can, if applicable, be separated so that only specific components can be used on the left or right side. This may, where applicable, result from the pre-wiring in the manner described above. However, the wiring can also be effected in such a way that all components can be used both to the left and to the right of the cable duct. As a rule, a locking device which is to prevent a simple pulling-out of the component, in particular when the component is still fully current-carrying, is also assigned to each component in the insertion region 27. This is to prevent the occurrence of sparks or arcs. Only after release of the locking device, which can be associated, for example, with a disconnection of the electrical supply, is removal of the corresponding component 18 to be possible, in particular in potentially explosive atmospheres. It is also possible to connect the components via explosion-protected connection devices to both the sub-distribution rail and the corresponding wiring in the direction of the connection block.

The encapsulation of the components 18 takes place precisely in potentially explosive atmospheres according to a corresponding ignition protection type, such as intrinsically safe or the like. The corresponding connection system between component and sub-distribution rail can also be provided in the "increased safety" ignition protection type and, for example, in connection with an explosion-protected switch. Via this switch, a current cutoff of the power supply of the component can be effected first so that no sparks/arcs occur when the component is removed.

The separating plate made of electrically insulating material ensures that each component contacts only the sub-distribution rail 8 to 14 provided for it and does not contact any other sub-distribution rails.

For the connection blocks 30, it likewise applies that in potentially explosive atmospheres they can be designed in the "increased safety" ignition protection type, wherein an arrangement of a plurality of connection blocks 30 for one insertion region 27 or another arrangement of the connection blocks is however also possible (see, for example, between vertically adjacent insertion regions 27 and not only between such an insertion region and the cable duct). It has already been pointed out that not only one cable duct 29 can be provided but that more than two cable ducts and in particular separate cable ducts for intrinsically safe and non-intrinsically safe circuits of the corresponding components or other devices can, for example, be provided in the switching and/or distributing device according to the invention.

The invention claimed is:

1. A switching and/or distributing device with at least one receiving housing and a housing cover, wherein in at least one housing rail region, a plurality of power distribution rails are arranged, which substantially extend in a main plane and are connected to first sub-distribution rails, which in the at least one housing rail region extend in a first plane substantially in parallel to the main plane, and second sub-distribution rails, which in the at least one housing rail region extend in a second plane substantially in parallel to the main plane, wherein the second plane is offset from the first plane, wherein the first and second sub-distribution rails are electrically insulated from one another and extend in a direction of at least one housing component region, wherein in the at least one housing component region, modular components, which contain an electrical/electronic operating means, are in electrical contact with one of the first and second sub-distribution rails, and wherein the first and second sub-distribution rails are changed in their course before or after reaching the at least one housing component region to run in a common plane.

2. The switching and/or distributing device according to claim 1, wherein the plurality of power distribution rails run substantially horizontally and the first and second sub-distribution rails run substantially vertically at an offset relative to one another.

3. The switching and/or distributing device according to claim 1, further comprising a busbar system consisting of the plurality of power distribution rails and the first and second sub-distribution rails.

4. The switching and/or distributing device according to claim 3, further comprising an insulating separating plate arranged between the modular components and the first and second sub-distribution rails, the insulating separating plate having openings for an electrical connection between the modular components and the first and second sub-distribution rails.

5. The switching and/or distributing device according to claim 4, wherein the modular components are latched in an electrical connection position to the insulating separating plate.

6. The switching and/or distributing device according to claim 5, further comprising bordered insertion regions into which at least one of the modular components can be inserted and can be latched in the electrical connection position are on an attachment side of the insulating separating plate opposite the first and second sub-distribution rails.

7. The switching and/or distributing device according to claim 6, wherein the bordered insertion regions protrude on the attachment side and are formed with a uniform grid dimension or a multiple of the uniform grid dimensions.

8. The switching and/or distributing device according to claim 6, wherein the insulating separating plate has a cable duct extending substantially horizontally or vertically between first and second sets of the bordered insertion regions.

9. The switching and/or distributing device according to claim 8, further comprising a connection block assigned to each of the bordered insertion regions and is wired to the cable duct.

10. The switching and/or distributing device according to claim 9, wherein the busbar system, the modular components, the cable duct and the connection block are pre-wired.

11. The switching and/or distributing device according to claim 9, wherein the connection block is of an "increased safety" ignition protection type.

12. The switching and/or distributing device according to claim 11, wherein the modular components and the first and second sub-distribution rails are electrically connected to one another in the "increased safety" ignition protection type.

13. The switching and/or distributing device according to claim 8, wherein the cable duct is included a plurality of cable ducts led out of the switching and/or distributing device, and some of the plurality of cable ducts are arranged for intrinsically safe circuits of the modular components and another some of the plurality of cable ducts are arranged for non-intrinsically safe circuits of the modular components.

14. The switching and/or distributing device according to claim 6, wherein all of the bordered insertion regions have dimensions that are substantially a same.

15. The switching and/or distributing device according to claim 4, further comprising a locking device formed in the insulating separating plate between the modular components and at least one of the bordered insertion regions or the openings of the insulating separating plate.

16. The switching and/or distributing device according to claim 1, wherein the modular components are detachably connected to the first and second sub-distribution rails.

17. The switching and/or distributing device according to claim 1, wherein the plurality of power distribution rails are arranged in the at least one housing rail region separated from the at least one housing component region.

18. The switching and/or distributing device according to claim 3, wherein the plurality of power distribution rails are detachably mounted on a rear wall of the at least one receiving housing.

19. The switching and/or distributing device according to claim 1, wherein each of the modular components has an encapsulated component housing and is designed to be explosion-protected.

20. The switching and/or distributing device according to claim 1, wherein the first plane and the second plane are arranged above and below the main plane respectively.

21. The switching and/or distributing device according to claim 1, wherein the modular components and the first and second sub-distribution rails are connected to one another in an "increased safety" ignition protection type connection.

22. The switching and/or distribution device according to claim 1, wherein the first sub-distribution rails extend along a front side of the plurality of power distribution rails, and the second sub-distribution rails extend along a back side of the plurality of power distribution rails.

23. The switching and/or distributing device according to claim 1, wherein the first sub-distribution rails extend in only a single plane within the at least one housing rail region.

24. The switching and/or distribution device according to claim 1, wherein the first and second sub-distribution rails change their course only a single time.

25. A plurality of the switching and/or distributing devices according to claim 1 arranged on wall frames and/or stand frames.

* * * * *